United States Patent [19]
Plantif et al.

[11] 3,958,949
[45] May 25, 1976

[54] GAS GENERATOR WITH A COMBUSTION CHAMBER LATERALLY SURROUNDED BY A COOLING CHAMBER

[75] Inventors: Bernard E. Plantif, Saint Medard-en-Jalles; Michel C. Pasquier, Merignac; Jean-Francois Tillac, Bordeaux Cauderan, all of France

[73] Assignee: Societe Nationale des Poudres et Explosifs, France

[22] Filed: June 6, 1974

[21] Appl. No.: 476,849

[30] Foreign Application Priority Data
June 26, 1973 France .................. 73.23306

[52] U.S. Cl. .................. 23/281; 102/39; 280/728
[51] Int. Cl.² .................. B01J 7/00
[58] Field of Search .................. 23/281; 222/3; 102/39 R; 280/150 AB; 128/142

[56] References Cited
UNITED STATES PATENTS

| | | | |
|---|---|---|---|
| 2,466,561 | 4/1949 | Standal | 102/39 |
| 3,142,850 | 8/1964 | Boer | 222/3 X |
| 3,411,807 | 11/1968 | Carey et al. | 280/150 AB |
| 3,663,035 | 5/1972 | Norton | 23/281 X |
| 3,715,131 | 2/1973 | Hurley et al. | 280/150 AB |
| 3,733,180 | 5/1973 | Heineck et al. | 23/281 |
| 3,807,957 | 4/1974 | Sevier | 23/281 |
| 3,817,263 | 6/1974 | Bendler et al. | 222/3 |
| 3,880,447 | 4/1975 | Thorn et al. | 23/281 X |

*Primary Examiner*—Joseph Scovronek
*Assistant Examiner*—Arnold Turk
*Attorney, Agent, or Firm*—Bucknam and Archer

[57] ABSTRACT

A gas generator for generating a large volume of gases at moderate temperature in an extremely short time comprises a central combustion chamber containing a solid pyrotechnic charge and an ignition device therefor. The combustion chamber is laterally surrounded by a cooling chamber with which it communicates by means of apertures. In the cooling chamber combustion gases formed on ignition of the pyrotechnic charge are cooled by contact with at least one solid coolant material. The cooled combustion gases are discharged from the generator through apertures in the side wall of the generator which are disposed symmetrically with respect to the axis of the generator, so that when the combustion gases leave the generator they exert substantially no propulsive force on the generator.

7 Claims, 4 Drawing Figures

GAS GENERATOR WITH A COMBUSTION CHAMBER LATERALLY SURROUNDED BY A COOLING CHAMBER

The present invention relates to gas generators which are capable of producing, within an extremely short period of time, a large volume of gas under pressure at moderate temperature. More particularly, the invention relates to gas generators in which gases are generated by combustion of a solid propellant and the combustion gases formed are cooled by bringing them into contact with a solid material which can absorb a large part of the heat of the gases by decomposing or subliming.

In our French Patent Application No. 73/14,239 of 18.4.1973, we have described gas generators of this type which comprise a central combustion chamber of cylindrical shape adapted to contain a pyrotechnic charge together with an ignition device therefor, and an annular cooling chamber surrounding the combustion chamber and containing at least one solid material for cooling the combustion gases formed on ignition of the pyrotechnic charge. The two chambers are connected to one another by means of apertures, whilst the cooling chamber communicates with the surroundings via discharge orifices or slits formed at one of its ends and oriented parallel to the axis of the cooling chamber.

At the instant of firing the pyrotechnic charge, this arrangement of the discharge orifices or slits creates a propulsive force which tends to change the position of the generator. This propulsive force could be absorbed by suitable means for holding the generator in position, but such forces are disadvantageous in some applications.

According to the present invention, we provide a gas generator which is not subject to this disadvantage and which comprises a combustion chamber adapted to contain a pyrotechnic charge and an ignition device therefor, a cooling chamber laterally surrounding the combustion chamber and adapted to contain at least one solid material for cooling the gases produced on ignition of the pyrotechnic charge, apertures between the cooling chamber and the combustion chamber to allow passage of combustion gases from the combustion chamber to the cooling chamber, radial apertures in the external wall of the gas generator to permit discharge of the combustion gases which have passed through the cooling chamber, the apertures in the external wall of the generator being disposed symmetrically with respect to the axis of the generator.

The combustion chamber is preferably of cylindrical shape.

According to a preferred embodiment of the invention, the apertures connecting the combustion chamber with the cooling chamber are formed in the side wall of the combustion chamber, but only at or near the ends of the side wall.

Preferably the pyrotechnic charge consists of two solid propellant charges which are placed on top of one another, and between which a single ignition device is inserted, the ignition device being preferably situated substantially in the central cross-sectional plane of the combustion chamber. The solid propellant charges preferably consist of hollow sticks of powder positioned parallel to the axis of revolution of the combustion chamber.

The cooling chamber may be divided into two annular compartments by a partition having apertures therethrough through which the gases can flow, the upstream compartment being filled with a solid coolant material with a high decomposition temperature and the downstream compartment being filled with a solid coolant material with a low decomposition temperature.

In one embodiment of the gas generator of the invention, the external side wall of the cooling chamber is the side wall of the generator.

In another preferred embodiment, an annular pressure release chamber is situated externally of the cooling chamber and is separated therefrom by an intermediate partition having apertures therethrough through which the gases flow, these apertures being positioned so as to be offset from the apertures for discharging gases in the external wall of the generator.

Preferably, grids are provided to prevent solid particles passing through the discharge apertures in the outer wall of the generator, or from passing through any apertured partition in the generator.

In order that the invention may be more fully understood, reference will now be made, by way of example, to the accompanying drawings, in which.

Figure 1:
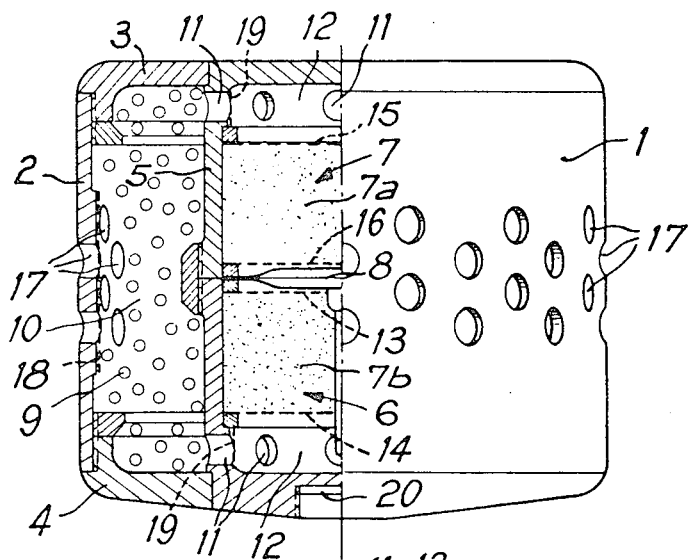
FIG. 1 is an elevation, the left hand side being in section, of one preferred form of gas generator according to the invention.

The gas generator shown in FIG. 1 comprises a body 1 consisting of a cylindrical casing 2 closed at its ends by two substantially circular plates 3 and 4. The space inside this body is divided, by a cylindrical partition 5 coaxial with the casing 2, into two chambers, namely an inner combustion chamber 6 containing a pyrotechnic charge 7 together with an ignition device 8, and a peripheral cooling chamber 9 containing a solid coolant material 10. The two chambers communicate with one another via two series of radial apertures 11, situated at each end of the inner partition 5. The apertures of each series, for example eight, each having a diameter of 5.8 mm, are distributed at regular intervals along the circumference of a circle, and communicate a free homogenisation space 12 provided in the combustion chamber above and below the pyrotechnic charge 7 with the cooling chamber. The pyrotechnic charge consists of two solid propellant charges 7a and 7b which generate gases and are stacked on top of one another, between which the ignition device 8 is inserted, substantially in the central cross-sectional plane of the combustion chamber.

The charges of solid propellant are held in place by wedging grids 13, 14, 15 and 16.

The pyrotechnic charge may, for example, be a composite powder containing 10% of cellulose triacetate, 86% of potassium perchlorate, 3.5% of tricresyl phosphate and 0.5% of acetylene black; and is preferably in the form of hollow sticks positioned parallel to the axis of the combustion chamber. Such a pyrotechnic charge has a combustion time of 16 milliseconds and ignites to give a pressure of 100 bars at a temperature of about 1,700°C.

The ignition device preferably contains a charge of ignition powder comprising 37% of zirconium and 63% of cupric oxide which ignites the solid propellant within about 6 milliseconds. This charge is connected by conducting wires to an electric ignition device which is not shown in the drawing.

The solid coolant material 10 contained in the cooling chamber 9 preferably consists of pellets of potassium perchlorate containing copper chromite as a decomposition catalyst. The decomposition temperature of this material is approximately 500°C.

To discharge the cooled gases from the cooling chamber, radial apertures 17 are formed in a median strip of the casing 2 symmetrically with respect to the axis of the casing. As shown in FIG. 1, there are four series of gas discharge orifices, each series being distributed at regular intervals along the circumference of one of four circles, the apertures of one series being staggered relative to those of the immediately adjacent series. According to one embodiment of the invention, the first orifices 11 and the second orifices 17 are out of alignment.

In order to prevent solid particles from being expelled from the generator when the generator is operated, retaining grids 18 and 19 are placed adjacent to the discharge apertures 17 and the apertures 11 respectively.

A positioning element 20 is provided at the centre of the plate 4 in order to mount the generator, for example on the steering wheel of a self-propelled vehicle.

During operation, the two solid propellant charges 7a and 7b are fired simultaneously by the ignition device 8; the gases resulting from the combustion of these two charges are mixed in the homogenisation spaces 12 of the combustion chamber and are then forced through the apertures 11 into the cooling chamber 9 in which they expand and come into contact with the pellets of solid coolant material 10. The latter decompose in contact with the hot gases, and the combustion gases thus cooled and diluted by the gases resulting from the decomposition of the coolant material are discharged from the cooling chamber via the apertures 17 and are used at the outlet of the generator, for example to inflate a safety cushion.

The coaxial positioning of the two chambers makes it possible to produce a simple and compact generator, whilst the lateral positioning of the discharge orifices and their symmetrical distribution with respect to the axis of the generator prevents the production of a propulsive force tending to change the position of the generator at the instant of firing of the pyrotechnic charge.

Figure 2:
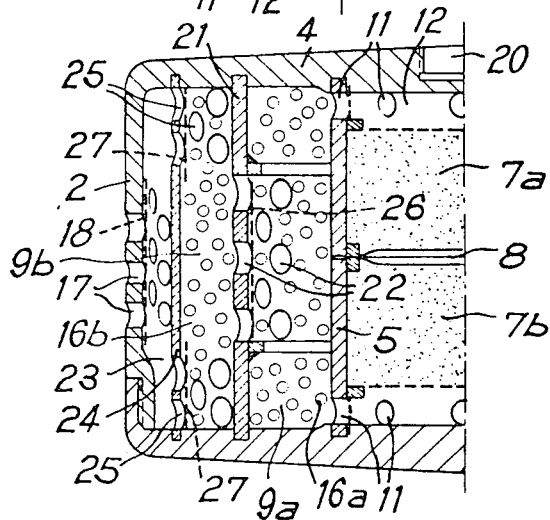
FIG. 2 is a sectional elevation of one half of a second preferred embodiment of gas generator according to the invention.

In the embodiment shown in FIG. 2, the cooling chamber is divided into two annular compartments 9a and 9b by an intermediate partition 21 having radial apertures 22 therethrough through which the gases flow, the apertures being formed in the middle part of the partition.

Externally of the external compartment 9b is positioned an annular pressure release chamber 23 from which the compartment 9b is separated by a second intermediate partition 24. The partition 24 has radial apertures 25 therethrough through which the gases flow, these apertures being positioned at the axial ends of the partition. The reason for staggering the apertures 22 and 25 is to lengthen the path of the gases through the cooling chamber.

The internal compartment 9a contains a first charge of solid coolant material 10a consisting of pellets of potassium perchlorate containing copper chromite as a decomposition catalyst. These pellets have a decomposition temperature of about 500°C.

The external compartment 9b contains a second charge of solid coolant material 10b consisting of pellets of sodium bicarbonate which have a decomposition temperature of about 170°C. Retaining grids 26 and 27 are placed in front of the orifices 22 and 25 respectively, in order to prevent particles of the coolant material from being expelled.

By way of example, in a particular embodiment the generator shown in FIG. 2 contained the following materials:

i. two solid propellant charges of total weight 36 g, consisting of sticks of external diameter 5.8 mm with 7 internal holes of internal diameter 1 mm, having a length of 20 mm, and produced from a composition of 10% of cellulose triacetate, 86% of potassium perchlorate, 3.5% of tricresyl phosphate and 0.5% of acetylene black, ii. a single ignition charge consisting of 2 g of powder comprising 37% of zirconium and 63% of cupric oxide, iii. a first solid coolant material 10a consisting of 70 g of pellets of potassium perchlorate of diameter 6 mm and thickness 5 mm, and iv. a second solid coolant material 10b consisting of 40 g of sodium bicarbonate in the form of pellets of diameter 4 mm and thickness 2 mm.

Operation of the generator containing these materials resulted in production of 45 liters of non-toxic gases which could be used, for example, to expand a safety cushion interposed between the dashboard and the driver of a vehicle. When the generator was employed to inflate such a safety cushion, the inflation time was from 20 to 30 milliseconds, the temperature of the gases produced did not exceed 300°C at the outlet of the generator, and the temperature of the external wall of the safety cushion inflated by the gases was below 70°C.

The composition of the gases emitted is given in the following table:

| Analysis of the gases at the outlet of the generator | |
|---|---|
| Gas | Concentration |
| Oxygen | 41% |
| Carbon dioxide | 41% |
| Water vapour | 17.8% |
| Carbon monoxide | 800 ppm |
| Nitrogen oxides | 5–10 ppm |
| Hydrogen chloride | 1 ppm |

Figure 3:
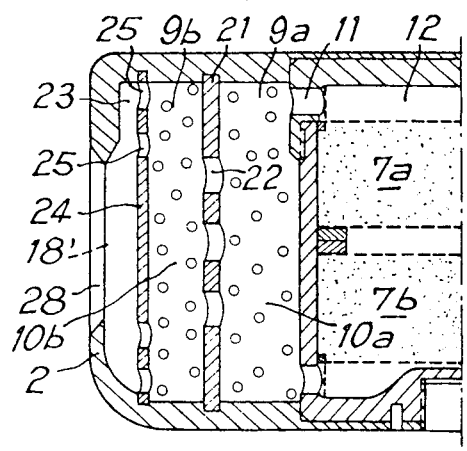
FIG. 3 is a sectional elevation of one half of a third preferred embodiment of gas generator according to the invention.
Figure 4:
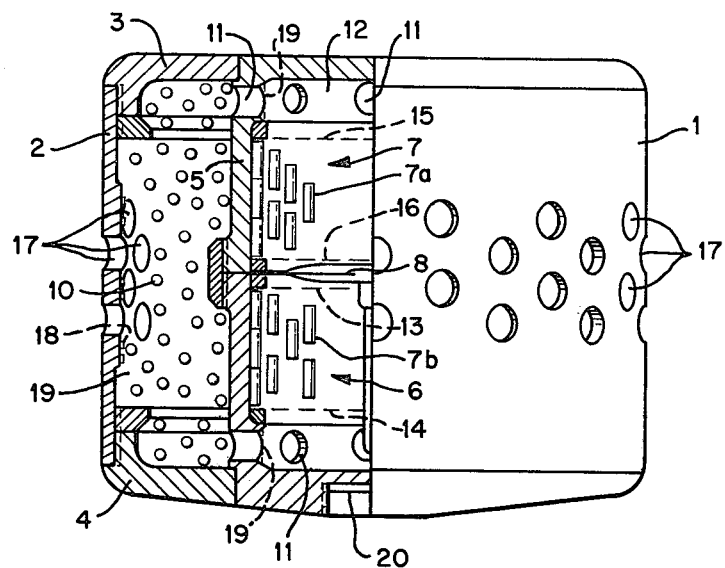
FIG. 4 is an elevation, the left hand side being in section, of one preferred form of the gas generator according to the invention.

The gas generator shown in FIG. 3 is similar to that shown in FIG. 2, but the gas discharge apertures are in the form of radial slits 28 distributed symmetrically relative to the axis of the casing 2 in the middle part of the casing, and a retaining grid 18' is placed adjacent to these slits in order to prevent particles of coolant material from being expelled. The gas generator shown in FIG. 4 shows the embodiment with the hollow sticks parallel to the axis of the generator.

What is claimed is:

1. A gas generator for producing a large volume of gases at moderate temperature in an extremely short time, stable during firing, which comprises an essentially cylindrical casing closed at its ends by two substantially circular plates, a cylindrical partition coaxial with said casing dividing the space within said casing into a combustion chamber containing a pyrotechnic charge and an ignition device therefor and a cylindrical cooling chamber completely surrounding the combustion chamber and adapted to contain at least one solid material for cooling the gases produced on ignition of the pyrotechnic charge, first orifices between the cooling chamber and the combustion chamber to allow passage of the combustion gases from the combustion chamber to the cooling chamber, said orifices being located essentially at both ends of said partition, second orifices arranged radially in the wall of the casing to permit discharge of the combustion gases which have passed through the cooling chamber, a homogenization space in the combustion chamber located above and below said pyrotechnic charge, the second orifices in the wall of the casing being disposed symmetrically with respect to the axis of the casing.

2. A gas generator according to claim 1, in which the cooling chamber comprises two annular compartments separated by a partition having orifices therethrough to allow the combustion gases to pass from one compartment to the other, the upstream compartment being adapted to contain a solid material for cooling the combustion gases which has a high decomposition temperature, and the downstream compartment being adapted to contain a solid material for cooling the combustion gases which has a low decomposition temperature.

3. A gas generator according to claim 1, in which an annular pressure release chamber is disposed externally of the cooling chamber and is separated therefrom by a partition having orifices therethrough to allow the combustion gases to pass from the cooling chamber to the pressure release chamber, the orifices in the partition being staggered with respect to the orifices in the casing.

4. A gas generator according to claim 1, in which a metal grid is provided adjacent to the orifices in the casing and adjacent to other orifices in the interior of the casing through which the combustion gases flow, to prevent passage of solid particles through the orifices.

5. The gas generator according to claim 1, wherein said first and second orifices are out of alignment.

6. A gas generator according to claim 1, in which the combustion chamber contains a pyrotechnic charge which comprises two solid propellant charges placed one on top of the other, an ignition device for the propellant charges being situated between the charges and located substantially in the central cross-sectional plane of the combustion chamber which is perpendicular to the axis of the casing.

7. A gas generator according to claim 6, in which the solid propellant charges consist of hollow sticks of powder positioned parallel to the axis of the combustion chamber.

* * * * *